United States Patent
Cotter

(10) Patent No.: US 11,460,087 B2
(45) Date of Patent: Oct. 4, 2022

(54) GAS SPRING WITH OVERTRAVEL PRESSURE RELIEF

(71) Applicant: DADCO, Inc., Plymouth, MI (US)

(72) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 92 days.

(21) Appl. No.: 16/825,813

(22) Filed: Mar. 20, 2020

(65) Prior Publication Data

US 2020/0300329 A1   Sep. 24, 2020

Related U.S. Application Data

(60) Provisional application No. 62/821,073, filed on Mar. 20, 2019.

(51) Int. Cl.
| | | |
|---|---|---|
| *F16F 9/43* | (2006.01) | |
| *F16F 9/32* | (2006.01) | |
| *F16F 9/02* | (2006.01) | |
| *F16K 17/40* | (2006.01) | |

(52) U.S. Cl.
CPC ............... *F16F 9/437* (2013.01); *F16F 9/02* (2013.01); *F16F 9/3242* (2013.01); *F16K 17/40* (2013.01); *F16F 9/3221* (2013.01)

(58) Field of Classification Search
CPC ........ F16F 9/437; F16F 9/3242; F16F 9/3235; F16F 9/346; F16F 9/512; F16F 9/02
USPC ............................... 267/119; 137/68.29, 68.3
See application file for complete search history.

(56) References Cited

U.S. PATENT DOCUMENTS

| | | | |
|---|---|---|---|
| 6,431,332 B1 | 8/2002 | Phelizot | |
| 7,748,398 B2 * | 7/2010 | Miller | B65D 77/06 |
| | | | 137/68.29 |
| 9,347,510 B2 | 5/2016 | Cotter | |
| 9,551,394 B2 | 1/2017 | Cotter | |
| 10,113,605 B2 | 10/2018 | Cotter | |
| 10,527,121 B2 | 1/2020 | Cotter | |
| 2004/0113336 A1 * | 6/2004 | Lundahl | F16F 9/437 |
| | | | 267/119 |
| 2005/0011552 A1 * | 1/2005 | Sundholm | A62C 35/68 |
| | | | 137/68.3 |

(Continued)

FOREIGN PATENT DOCUMENTS

| | | | |
|---|---|---|---|
| CN | 204153041 | 2/2015 | |
| CN | 107504119 | 12/2017 | |
| CN | 107504119 A | * 12/2017 | ................ F16F 9/02 |

(Continued)

OTHER PUBLICATIONS

PCT/US2020/024001 International Search Report and Written Opinion dated Jul. 17, 2020 (Jul. 17, 2020) Applicant Dadco, Inc.

*Primary Examiner* — Thomas J Williams

(74) *Attorney, Agent, or Firm* — Reising Ethington P.C.

(57) ABSTRACT

An industrial gas spring with a pressure chamber in a casing with an end wall, a piston rod received at least in part in the casing for reciprocation between extended and retracted positions and a pressure relief assembly carried by the end wall. The pressure relief assembly may have a membrane communicating with the pressure chamber and a plunger configured to breach the membrane when engaged and moved by the piston rod when it overtravels its design intended retracted position.

18 Claims, 12 Drawing Sheets

(56) References Cited

U.S. PATENT DOCUMENTS

2013/0228069 A1* 9/2013 Cappeller ............ F16F 9/0218
                                                    92/169.1

FOREIGN PATENT DOCUMENTS

DE         60223190 T2 *  8/2008  .............. F16F 9/435
WO      2009/0633003 A1    5/2009

* cited by examiner

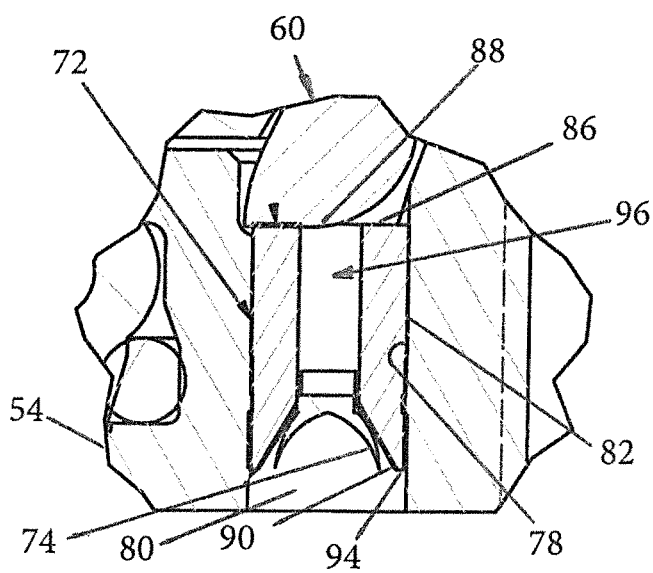
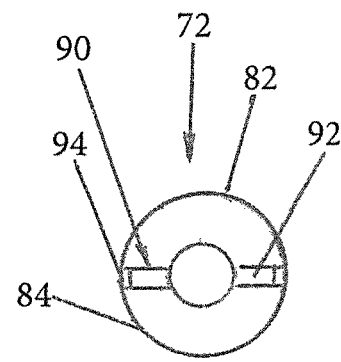
FIG. 3
FIG. 4
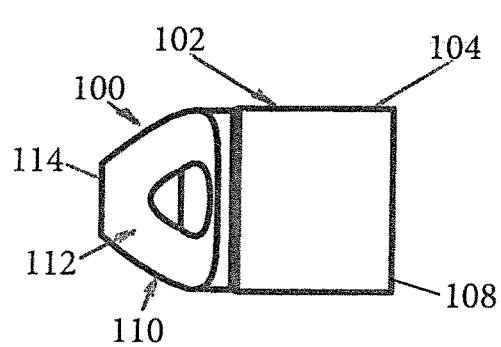
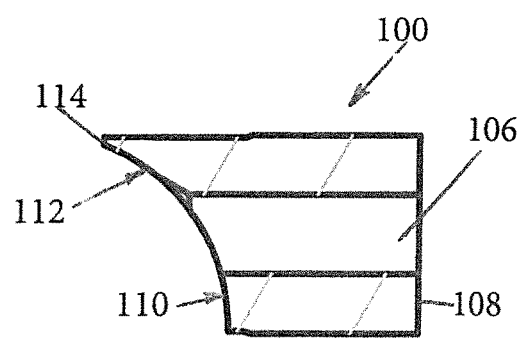
FIG. 5
FIG. 6
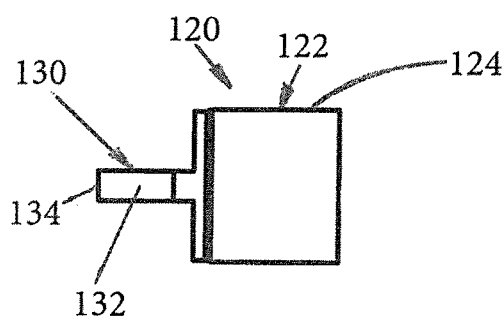
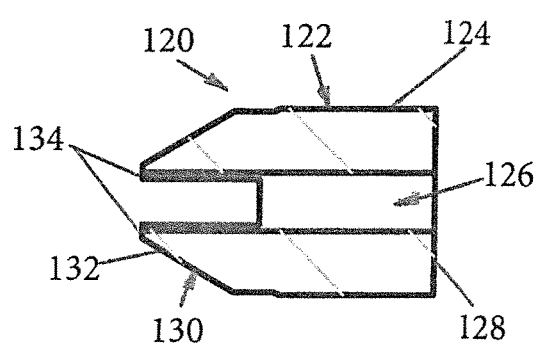
FIG. 7
FIG. 8

GAS SPRING WITH OVERTRAVEL PRESSURE RELIEF

CROSS-REFERENCE TO RELATED APPLICATION

This application claims the benefit of U.S. Provisional Application No. 62/821,073 filed Mar. 20, 2019 which is herein incorporated by reference in its entirety.

TECHNICAL FIELD

This invention relates generally to industrial gas springs for forming equipment and more particularly to overtravel pressure relief for industrial gas springs.

BACKGROUND

Industrial gas springs are well known and have been used in many applications of forming equipment including dies of presses for sheet metal stamping, punching, and piercing operations.

For example, one or more of the gas springs may be used in various implementations of forming equipment to provide a movable component for support of a forming die or workpiece with a yielding force or a return force. For example, in a binder ring implementation, the gas spring provides a yielding force against the binder ring of a forming die to hold a metal workpiece while another part of the forming die forms, cuts, stretches, stamps, pierces or bends the workpiece or withdraws from the workpiece. In a lifter implementation, the gas spring may provide a yielding force and a return force to lift a workpiece off of a surface of the forming die or to otherwise maintain control of the workpiece. In a cam tool implementation, a gas spring may apply a yielding force to return a cam activated tool to its home position. Of course, a gas spring may be used in a wide range of other implementations.

A conventional industrial gas spring may include a casing, a piston rod received in the casing, a piston rod bearing and seal housing carried by the casing, and a pressure chamber to hold pressurized gas, typically nitrogen, at an operating pressure of, for example, 1000-5000 psi in some applications. The pressurized gas biases the piston rod to an extended position, and yieldably resists movement of the piston rod from the extended position to a retracted position. But the piston rod may overtravel beyond a designed intended retracted position and this overtravel may result in undesirable gas over pressure and other adverse conditions. The rapid return from an overtravel retracted position to the extended position of the piston rod may also damage the forming equipment and/or a workpiece with which the gas spring is used. In an overtravel position of the piston rod, the gas pressure in the chamber may be on the order of 50% to 100% higher than its pressure in the normally fully extended position of the piston rod.

SUMMARY

In at least some forms, an industrial gas spring with a piston rod and a pressure chamber may have a pressure relief assembly carried by an end wall of a casing. The pressure relief assembly may have a membrane communicating with the pressure chamber and a plunger configured to breach the membrane when engaged and moved by overtravel of the piston rod from its design intended maximum retracted position.

In at least some forms, the membrane may be a homogenously integral part of the end wall and in other forms a separate piece. In at least some forms, the plunger may have a passage communicating the pressure chamber with the membrane. In at least some forms, the plunger may have one or more relatively sharp edges for breaching the membrane.

In at least some forms, the pressure relief assembly may have a body received in the end wall and carrying the membrane. In at least some forms, the body may also carry the plunger. In at least some forms, the plunger may be slideably received in the body.

BRIEF DESCRIPTION OF THE DRAWINGS

The following detailed description of preferred embodiments and best mode will be set forth with regard to the accompanying drawings in which:

FIG. 3 is an enlarged fragmentary sectional view of the circled portion of FIG. 2;

FIG. 4 is an end view of the plunger of FIG. 2;

FIG. 5 is a side view of a first modified form of a plunger;

FIG. 6 is a sectional view of the plunger of FIG. 5;

FIG. 7 is a side view of a second modified form of a plunger;

FIG. 8 is a sectional view of the plunger of FIG. 7;

DETAILED DESCRIPTION OF PREFERRED EMBODIMENTS

Referring in more detail to the drawings they illustrate various forms of a pressure relief assembly of an industrial gas spring for forming equipment. In the relief assembly, overtravel of a piston rod beyond its intended design maximum retracted position, engages and moves a plunger to pierce, cut or otherwise breach a metal membrane to vent or relieve pressurized gas in a pressure chamber to escape to the exterior of a casing of the gas spring. This release of pressurized gas decreases the force with which the piston rod may return from its overtravel position toward its fully extended position and in some applications may inhibit a piston rod from completely returning to its fully extended position. This avoids damage to the forming equipment and/or work piece with which the gas spring is used.

Figure 1:
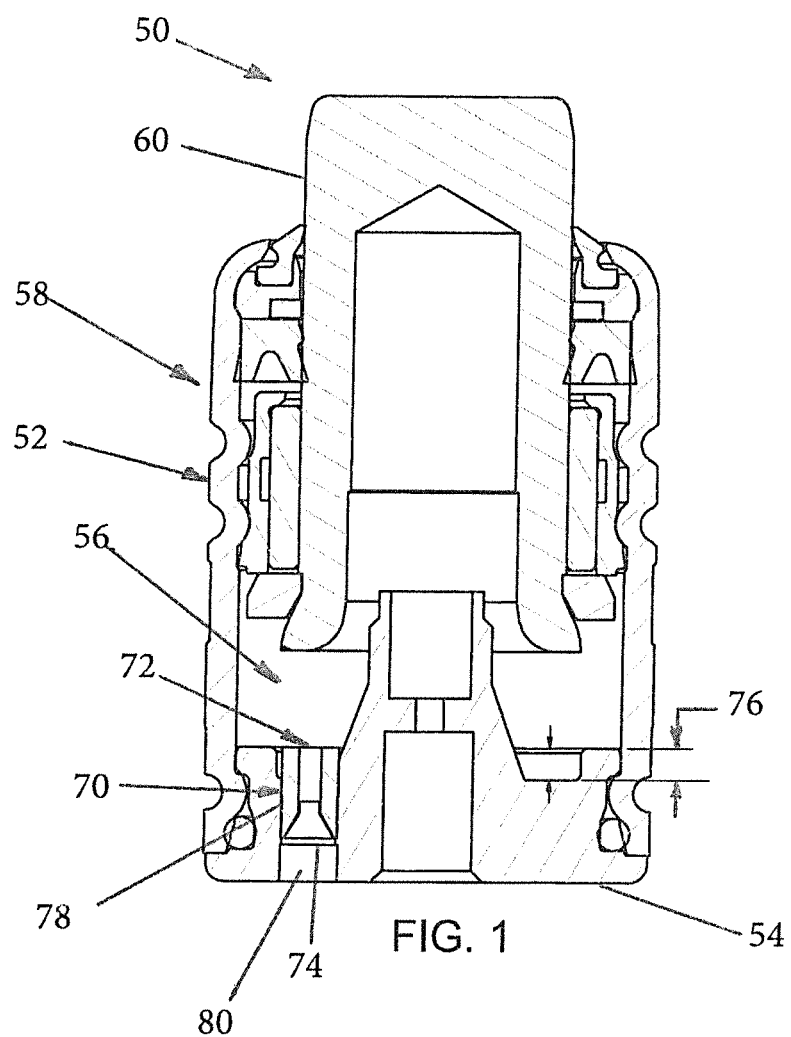
FIG. 1 is a sectional view of an industrial gas spring with a piston rod in its extended position and having an overtravel pressure relief assembly.

As shown in FIG. 1, an industrial gas spring 50 for forming equipment may include a casing 52 with a rear head or wall 54, a pressure chamber 56, a guide bearing and seal assembly 58 carried by the casing, and a piston rod 60 received through the guide and seal assembly and in part disposed in the pressure chamber. In use, the pressure chamber may be filled with a compressed gas, typically nitrogen, at a pressure in the range typically for example of 1,000 to 5,000 psi in many applications. The compressed gas in the chamber yieldably urges the piston rod to its fully extended position as shown in FIG. 1 with its outer end projecting outwardly of the adjacent end of the casing. In use the outer end of the piston rod 60 may be engageable with or by a die member or another portion of a press or forming equipment (not shown) which may reciprocate the piston rod between its fully extended position and its design intended maximum retracted position.

Figure 2:
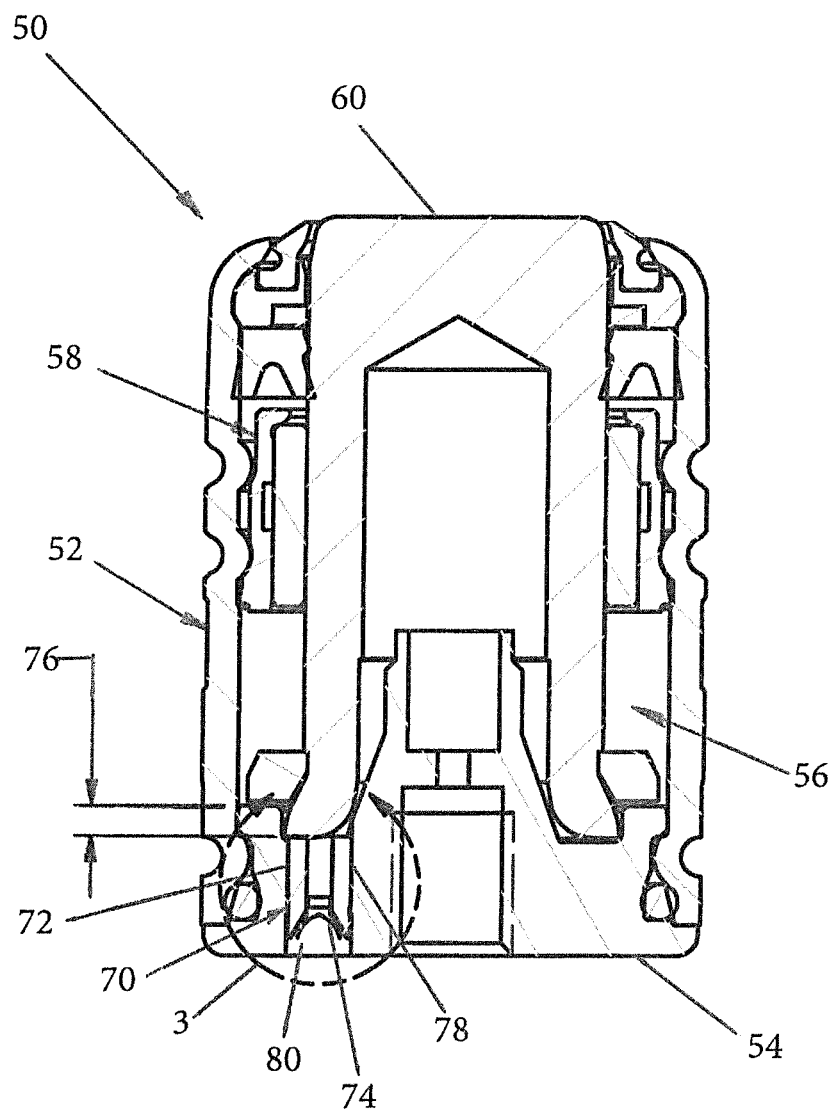
FIG. 2 is a sectional view of the gas spring of FIG. 1 with the piston rod in an overtravel retracted position actuating the pressure relief assembly.
Figure 9:
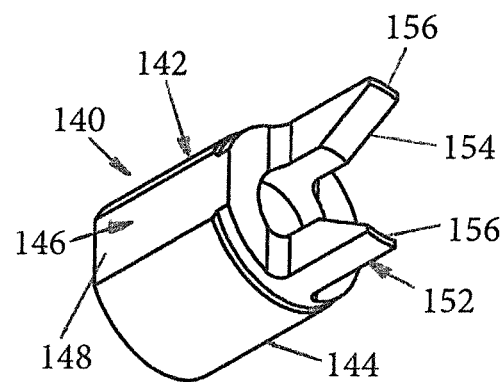
FIG. 9 is a perspective view of a third modified form of a plunger.
Figure 10:
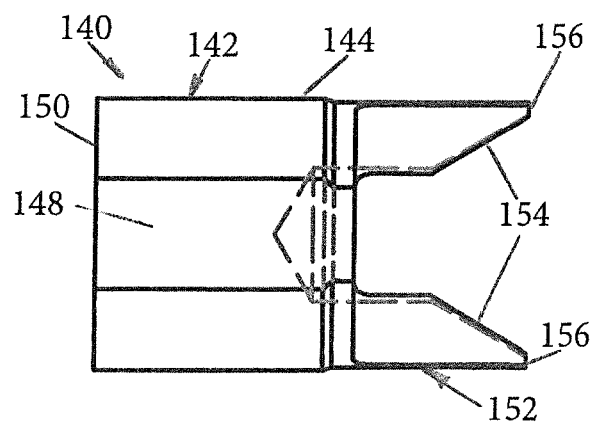
FIG. 10 is a side view of the plunger of FIG. 9.
Figure 11:
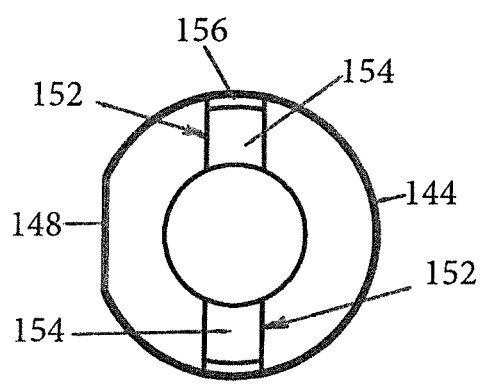
FIG. 11 is an end view of the plunger of FIG. 9.
Figure 12:
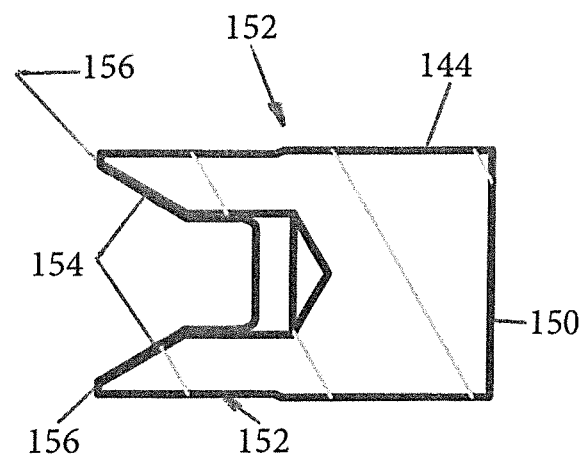
FIG. 12 is a sectional view of the plunger of FIG. 9.

The gas spring 50 includes an overstroke or overtravel pressure relief assembly 70 which in the event of an overtravel retraction of the piston rod 60 beyond its intended design maximum retracted position (FIG. 2), vents the pressure chamber 56 to the exterior of the gas spring to relieve or significantly decrease the pressure of the compressed gas therein. The pressure relief assembly (hereinafter relief assembly) may have a plunger 72 moved by the piston rod 60 as it overtravels in a retraction stroke to cut, shear, pierce, or breach a membrane 74 to open a path for venting or escape of pressurized gas in the chamber 56 to the exterior of the gas spring. As shown in FIG. 2, the extent of overtravel 76 of the piston rod 60 resulting in breaching of the membrane 74 may be on the order of 0.060 of an inch (1.52 mm).

The membrane 74 may be formed as an integral part of the head 54 of the casing as a separating wall between two opposed blind bores 78 and 80 with the one bore 78 opening into and communicating with the pressure chamber 56 and the other generally opposed bore 80 communicating with the exterior of the gas spring by opening through the exterior face of the head 54. The membrane 74 is thin enough to be breached with a reasonable amount of force but strong enough not to be fatigued under the normal operating conditions of the gas spring by the pressure changes to which it is subjected by each normal cycle of retraction and extension of the piston rod 60 which cycle may be relatively rapid and occur typically in the range of 20-60 complete cycles per minute when the gas spring is in use.

The thickness of the membrane 74 may in part be dependent on the maximum operating pressure of the compressed gas in the chamber, the surface area of the membrane exposed to this pressurized gas and the material from which the membrane is made. For a 1020 carbon steel head with an integral membrane and a bore 78 and thus a membrane diameter in the range of about 0.12 to 0.15 of an inch (3-4 mm), a nominal thickness of the membrane 74 may typically be in the range of 0.010 to 0.020 of an inch (0.25 to 0.50 mm) and desirably about 0.010 to 0.012 of an inch (0.25 to 0.30 mm). Desirably the bores 78 & 80 are coaxial and the bore 80 may be somewhat larger than the bore 78 to provide some clearance for the cut or pierced portions of the membrane 74 as it is breached by the plunger 72.

As shown in FIGS. 3 and 4 the plunger 72 may be a body 82 with a cylindrical peripheral surface 84 and a generally planar imboard end 86 configured to engage with an inboard end 88 of the piston rod 60 as it overtravels. Adjacent to its other end, the plunger 72 may have two desirably diametrically opposed and axially extending fingers 90 each with a beveled free end which may be formed with an inclined arcuate or planar surface 92 to provide a relatively sharp edge 94 for cutting, piercing, shearing or breaching the membrane 74 by the plunger as it is moved by the overtraveling piston rod 60 to advance the cutting edge 94 through the membrane to breach it. The plunger 72 may also have a preferably coaxial throughbore 96 which provides a vent passage through which compressed gas in the chamber 56 may flow through the membrane 74 when it is breached and to the exterior of the gas spring 50. The plunger 72 may be received with a press or interference fit in the bore 78 to retain it therein. The extent of this press fit must be small enough that the plunger can be readily and rapidly advanced by overtravel of the piston rod 60 without undue force such as an ISO interference or transitional fit such as H7/f6 fit. This interference fit of the plunger 72 ensures that it inadvertently does not move out of the bore 78 and into the pressure chamber 56 during normal use of the gas spring 50. This interference fit may provide axial space and area saving of the relief assembly and the head which may be particularly useful for smaller size gas springs such as smaller diameter gas springs.

FIGS. 5 and 6 illustrate a first modified plunger 100 that may be used in lieu of the plunger 72 of FIGS. 1-4. This modified plunger 100 may have a body 102 with a cylindrical peripheral surface 104, a through vent bore 106 which preferably is coaxial with the cylindrical surface, a generally planar first end 108 engageable by the overtraveling piston rod 60, and a second end with an arcuate or curved portion 110 providing a single projection 112 with a sharp edge or tip 114 for piercing, cutting or breaching the membrane 74. This plunger 100 may be press fit in the bore 78 of the head 54 of the gas spring 50.

FIGS. 7 and 8 illustrate a second modified plunger 120 which may be used in lieu of the plunger 72. This modified plunger 120 has a body 122 with a cylindrical peripheral surface 124, a through bore vent passage 126, a first end 128 which may be generally planar for engagement by the overtraveling piston rod 60, and adjacent its other end two generally diametrically opposed and axially extending fingers 130 each with a beveled outer face 132 which may be arcuate or planar to form a relatively sharp tip or edge 134 which can cut, shear, pierce, or breach portions of the membrane 74 radially inward from its perimeter to thereby breach a central portion of the membrane and deflect it away from the central bore vent passage 126. This modified plunger may be press fit in the bore 78 of the head 54 of the gas spring 50.

A third modified plunger 140 is illustrated in FIGS. 9-12 which may be used in lieu of the plunger 72. This plunger 140 may have a body 142 with an outer cylindrical surface 144 extending circumferentially around only part of the circumferential extent of the body and merging into a recessed portion 146 which may be an axially and transversely extending flat surface 148 with a central portion radially imboard of the outer cylindrical surface 144 to provide a vent passage in cooperation with the bore 78 of the rear head 54. This plunger 140 may have a transverse inner end 150 which may be engaged by the overtraveling piston rod 60 and adjacent its other end a pair of diametrically opposed fingers 152 projecting axially outwardly and each having a beveled surface 154 which may be arcuate or planar adjacent its free end and a relatively sharp outboard edge 156 which can cut, shear, pierce or breach the membrane 74 when moved or advanced by the overtraveling piston rod 60 through the membrane. These fingers 152 may be circumferentially spaced from the vent surface 148 and desirably each finger may be circumferentially spaced substantially 90 degrees from the vent surface. This plunger 140 may be press fit in the bore 78 of the head 54.

In use, all of these plungers 72, 100, 120, and 140 cut, shear, pierce or breach the membrane 74 when advanced at least partially through it by the overtraveling piston rod 60 bearing on and moving the plunger into and through or at least partially through the membrane.

Figure 13:
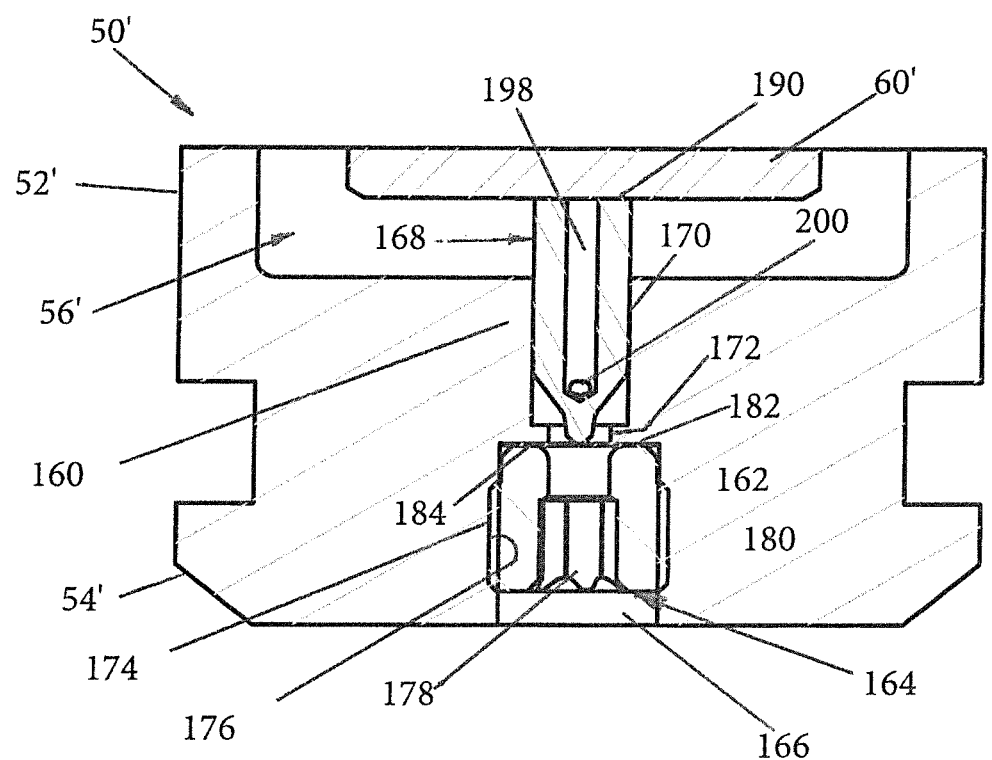
FIG. 13 is a fragmentary sectional view of a gas spring with a first modified overtravel pressure relief assembly.

FIG. 13 illustrates another form of an overtravel pressure relief assembly 160 received in a rear head 54' of a casing 52' of a gas spring 50' with a piston rod 60' slidably received in a bearing and seal assembly. This gas spring 50' may have substantially the same construction and arrangement as the gas spring 50 of FIGS. 1 and 2. This relief assembly 160 may have a separate membrane 162 in the form of a disc removably retained by a collar 164 in a bore 166 communicating with the exterior of the head 54' and a plunger 168 received in an opposed bore 170 opening into the pressure chamber 56'. These bores 166, 170 may be connected by an intermediate bore 172. The collar 164 may have external threads 174 threadably engageable with complimentary internal threads 176 in the bore 166 and a non-circular recess or socket 178 such as a hexagonal socket for receiving a tool to install and remove the collar from the bore. The collar may have a through vent passage 180, and the other end may have a circumferentially continuous surface 182 which may be planar or slightly arcuate in cross-section for engagement with the disk membrane 162 to force it into metal to metal sealing engagement with a circumferentially continuous shoulder and/or end face 184 of the bore 166 when the collar 164 is securely threaded into the bore.

Figure 14:
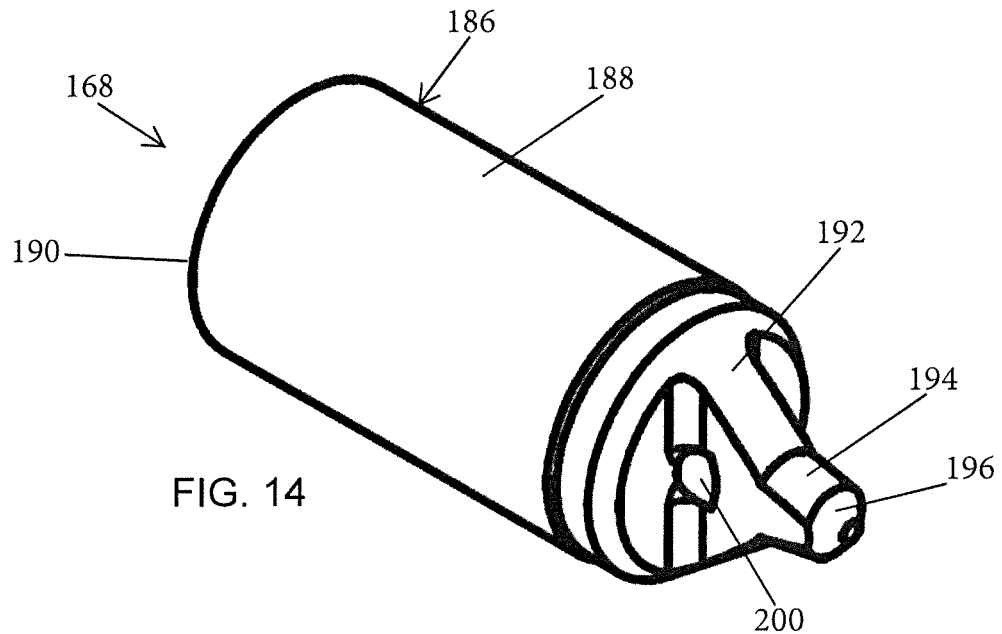
FIG. 14 is a perspective view of a plunger of the relief assembly of FIG. 13.

As shown in FIGS. 13 and 14, the plunger 168 may have a body 186 with a cylindrical outer surface 188, one end 190 which may be planar for engagement by the overtraveling piston rod 60' and at the other end a pair of diametrically opposed buttresses or narrowing shoulders 192 merging into a neck 194 with a tip 196 for piercing or breaching the membrane. These shoulders 192 may become radially narrower as they extend toward the neck 194 and the neck may become radially narrower as it extends toward the tip 196. The tip 196 may be substantially frustoconical to provide a relatively pointed portion to initially pierce or breach the membrane 162, and the neck and shoulders may displace a portion of the pierced membrane generally radially outward as they are moved partially into the membrane by an overtraveling piston rod.

To provide a vent path, a blind axial bore 198 in the plunger 168 may communicate at one end with the pressure chamber 56' and at the other end with a transverse bore 200 through the shoulder portion 192 to relieve compressed gas from the chamber 56' when the disk membrane 162 is pierced by the plunger. To retain the plunger 168 in the bore 170 during normal operation of the gas spring 50' it may be pressed with a slight interference fit into the bore. On one hand this interference fit should produce a sufficient frictional force to retain the plunger 168 in the bore 170 and on the other hand insufficient frictional force to prevent movement of the plunger further into the bore to pierce or breach the membrane 162 by overtravel of the piston rod 60'. Typically, this plunger 168 may have an ISO transition similar fit in the bore.

Figure 15:
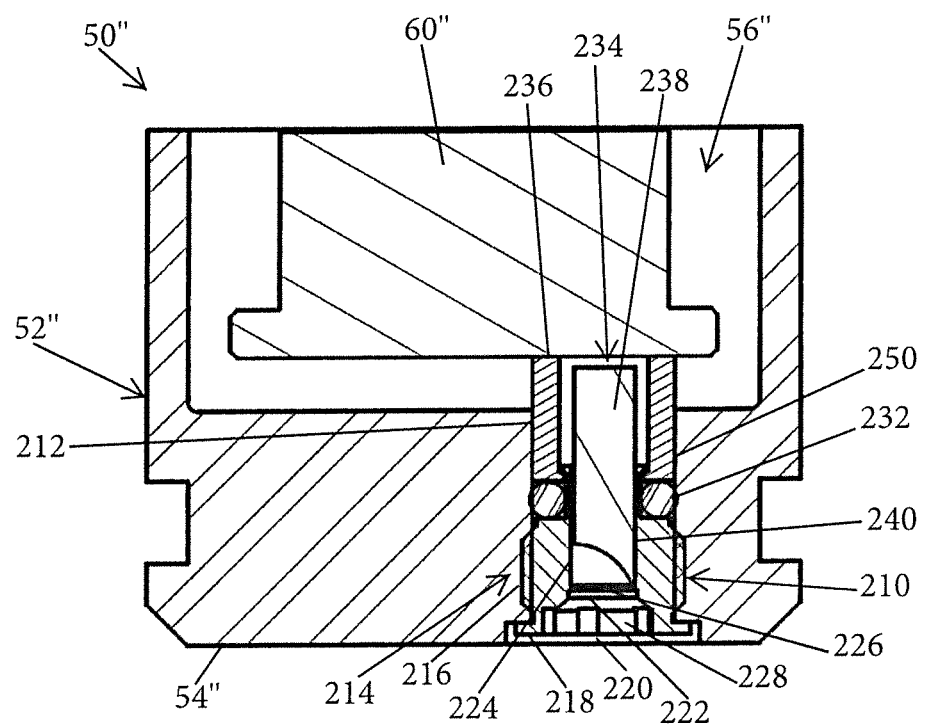
FIG. 15 is a fragmentary sectional view of a gas spring with a second modified overtravel pressure relief assembly.

FIG. 15 illustrates another pressure relief assembly 210 removably received in a bore 212 through a rear head 54" of a gas spring 50". This relief assembly 210 may have a collar or body 214 with external threads 216 threadably engageable with complimentary threads in the bore and a peripheral flange 218 engageable with a shoulder of a counterbore 220 to limit the extent to which the body may be advanced into the bore. The body 214 may have a membrane 226 integrally formed therewith and disposed between a blind bore or passage 224 opening into the pressure chamber 56" and a blind bore or passage 222 opening to the exterior of the gas spring 50". The passage 226 may include a socket portion 228 having a non-circular configuration such as square or hexagonal configured to receive a tool for threadably installing and removing the relief assembly 210 from the rear head 54" of the casing 52". The body 214 may include a circumferentially continuous groove 230 configured to receive a seal 232 such as an o-ring to provide a gas tight seal between the body and the rear head 54".

Figure 16:
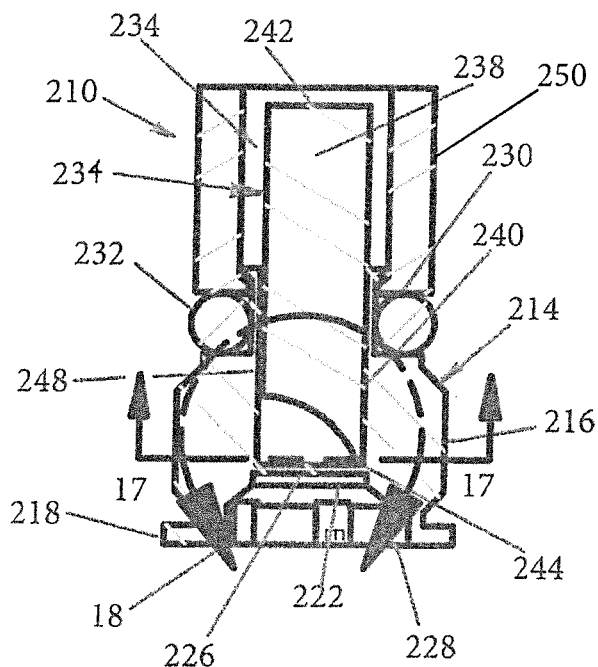
FIG. 16 is an enlarged sectional view of the second modified overtravel pressure relief assembly of FIG. 15.
Figure 17:
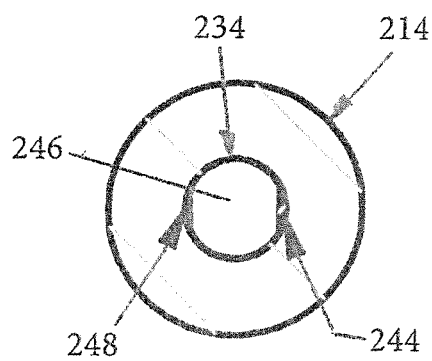
FIG. 17 is an enlarged sectional view taken on line 17-17 of FIG. 16.
Figure 18:
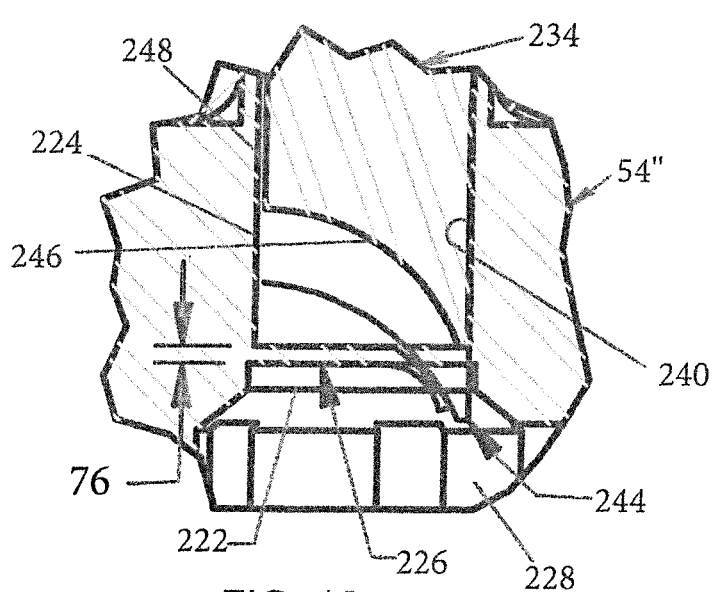
FIG. 18 is a fragmentary enlarged sectional view of the portion of FIG. 16 within the circle 18.

As shown in FIGS. 15 and 16 a plunger 234 may have a body 236 with an exterior cylindrical surface 238 which in assembly may be received in part in the bore 240 with a press or interference fit. One end of the plunger may have a generally planar face 242 configured for engagement by an overtravelling piston rod 60" and the other end may include a relatively sharp edge 244 configured to cut, pierce, or breach the membrane 226 when, as shown in FIG. 18, the sharp edge is moved at least partially through the membrane 226 by overtravel of the piston rod. The relatively sharp edge 244 may be formed adjacent part of the circumferential periphery of the plunger by an arcuate surface 246 adjacent to the end of the plunger. A vent passage between the plunger 234 and the bore 240 in which it is received may be provided by a longitudinally or axially extending recessed surface 248 (FIGS. 17 and 18) which may be planar and disposed radially inward of the radius of the cylindrical surface 238 of the plunger to provide a passage between the plunger and the bore through which compressed gas in the pressure chamber 56" may flow when the plunger breaches the membrane 226. Desirably this recessed portion 248 of the plunger is generally diametrically opposed to the cutting edge 244 of the plunger. In lieu of the plunger 234 any of the plungers 72, 100, 120, 140 and 168 may be used in this relief assembly 210.

When there is no compressed gas in the chamber 56" of the gas spring 50" such as during shipment and/or servicing of the gas spring, the membrane 226 of the relief assembly 210 may be protected from accidental or inadvertent cutting, piercing or breaching thereof by a tube or sleeve 250 (FIGS. 15 and 16) received, such as with a press fit, in the bore 212. This sleeve extends axially to and desirably slightly beyond the adjacent end of the plunger, and is made of a suitable yieldable material such as a polymer or a thin metal tube so that it is readily collapsed, compressed or crushed by the overtravelling piston rod 60" which actuates the plunger 234 to breach the membrane 226 when in use the gas spring 50" has compressed gas in its pressure chamber 56". This relief assembly 210 may be particularly desirable for gas springs with an internal configuration which requires that its relief assembly must be installed from only the exterior of the rear head.

Figure 19:
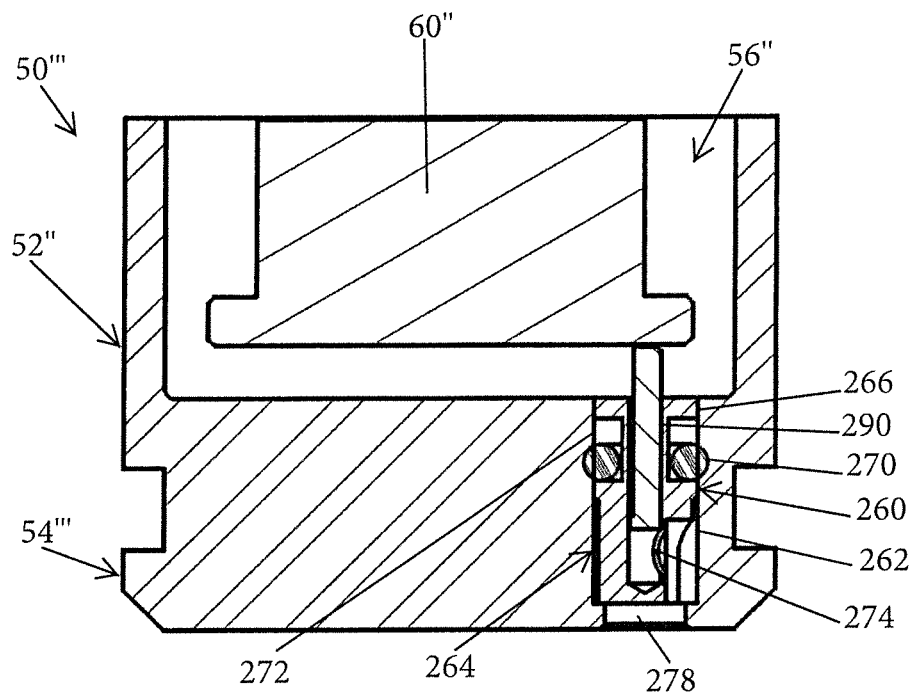
FIG. 19 is a semi-schematic fragmentary sectional view of a gas spring with a third modified overtravel pressure relief assembly.
Figure 20:
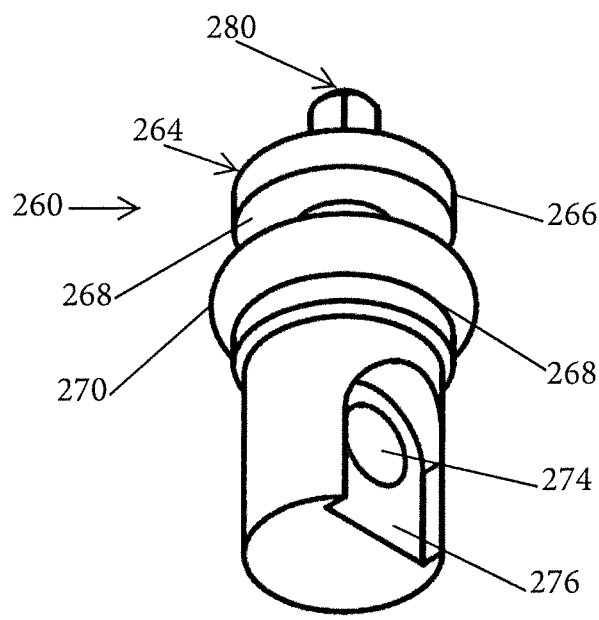
FIG. 20 is an enlarged perspective view of the overpressure relief assembly of FIG. 19.
Figure 21:
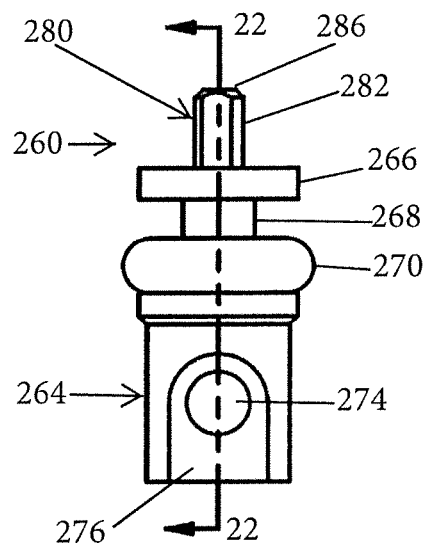
FIG. 21 is a side view of the pressure relief assembly of FIG. 19.
Figure 22:
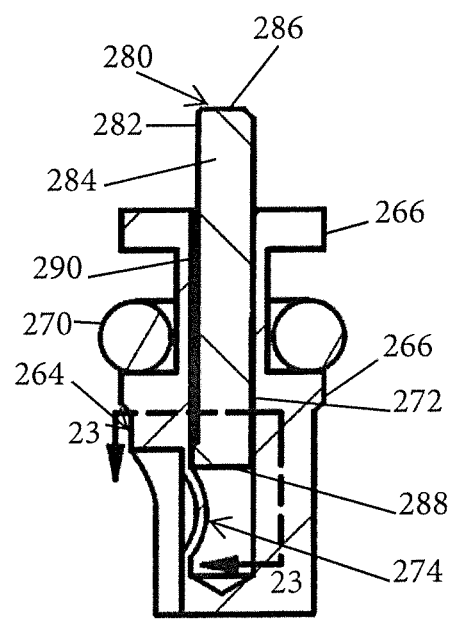
FIG. 22 is a sectional view taken generally on line 22-22 of FIG. 21.
Figure 23:
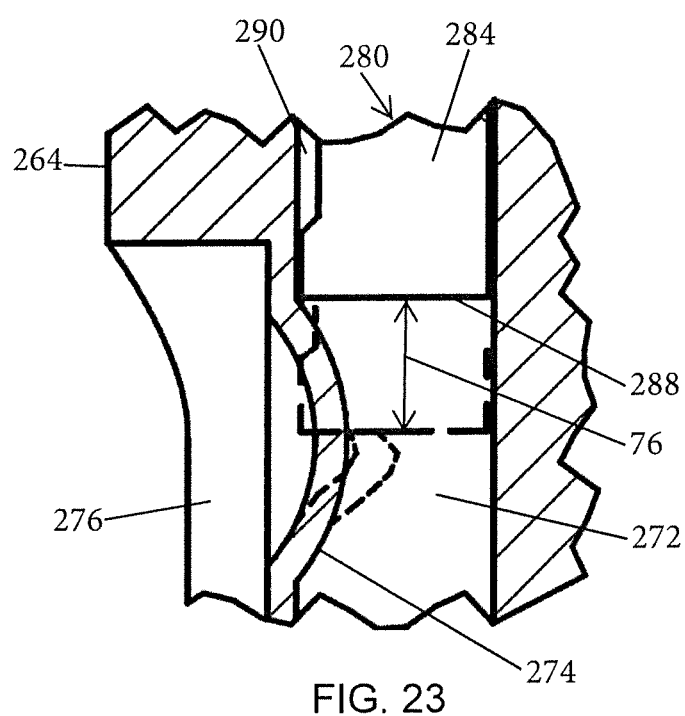
FIG. 23 is an enlarged fragmentary sectional view taken generally on line 23-23 of FIG. 22.

FIG. 19 illustrates another form of a pressure relief assembly 260 received in a bore 262 through a rear head 54''' of gas spring 50''' which at one end communicates with a pressure chamber 56" and at the other end with the exterior of the gas spring. This relief assembly 260 may have a body 264 with a cylindrical portion 266 which may be received with a press or interference fit in the bore 262 in the rear head 54'''. The body 264 may have a circumferentially continuous groove 268 therein configured to receive a seal 270 such as an o-ring to provide a gas tight seal between the body and the bore 262 in which it is received. As shown in FIGS. 19, 22, and 23, the body may have a blind bore 272 therein with its open end communicating with the pressure chamber 56" and adjacent its closed end communicating with one face of an integral membrane 274 extending at least in part generally radially into the bore. The body may have a recess or slot 276 therein which communicates the other face of the membrane 274 with the exterior of the rear head 54''' through an adjacent portion of the bore 272 and a counterbore 278 of the head. After forming the blind bore 272 and the slot 278 with a thin metal portion between them, the membrane 274 may be further formed by pressing at least part of this thin metal portion generally radially into the bore 272 to provide a dimpled membrane 274 or other form of a membrane protecting radially into the bore.

A plunger 280 may have a body 282 with a cylinderical exterior surface 284 and with one end 286 being generally planar and configured to be engaged by an overtraveling piston rod and the other end 288 being relatively sharp and configured for cutting, shearing or breaching the membrane 274 when an overtraveling piston rod 60" advances the plunger 280 further into the bore 272. To provide a vent path to the membrane 274 the plunger body 282 may have an axially extending recessed portion 290 which may be a flat surface extending axially and disposed radially inward of the circumferential exterior portion 284 of the plunger. This recessed portion 290 ends close to but spaced from the sharp edge 288. To retain the plunger 280 in the body 264 it may be received in the bore 272 with a slight press or interference fit sufficient to retain it in the bore but not producing sufficient frictional force to prevent the plunger from being advanced into the bore by an overtravelling piston rod 60" to cut, shear, or otherwise breach the membrane 274.

Figure 24:
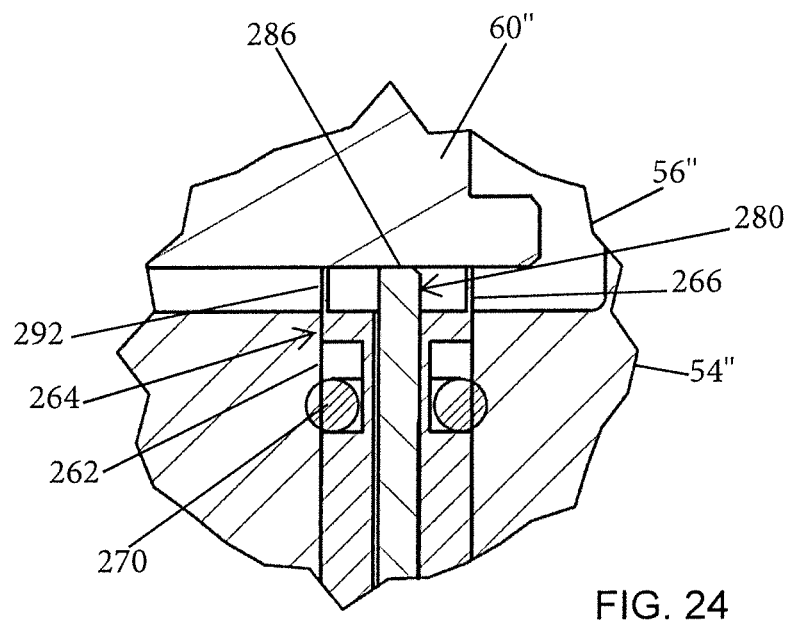
FIG. 24 is a semi-schematic fragmentary sectional view of a modified body of the pressure relief assembly of FIG. 19.

FIG. 24 illustrates a modification of the relief body 264 by the addition of an integral thin metal yieldable tubular portion 292 to the end of the body 264 and projecting into the pressure chamber 56". This tubular portion 292 extends axially to at least and desirably slightly beyond the adjacent end 286 of the plunger 280 to prevent the piston rod 60" from accidentally moving the plunger to breach the membrane 274 when there is no compressed gas in the pressure chamber 56''' such as during shipment or service of the gas spring 50'''.

Figure 25:
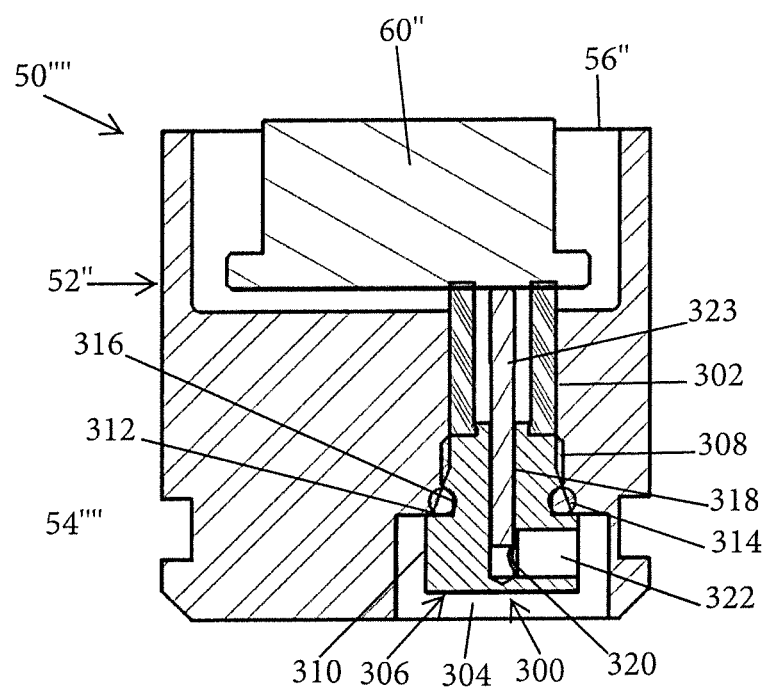
FIG. 25 is a semi-schematic fragmentary sectional view of a gas spring with a fourth form of an overtravel pressure relief assembly.
Figure 26:
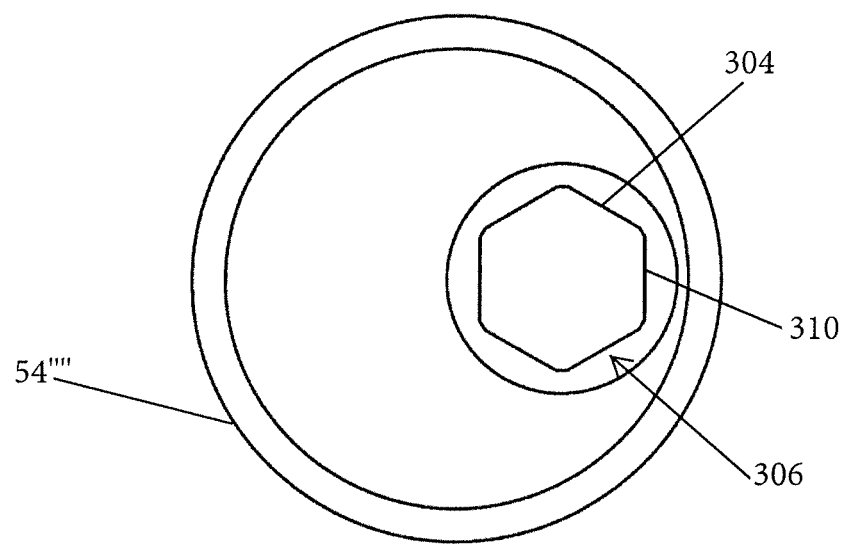
FIG. 26 is an end view of the gas spring and pressure relief assembly of FIG. 25.
Figure 27:
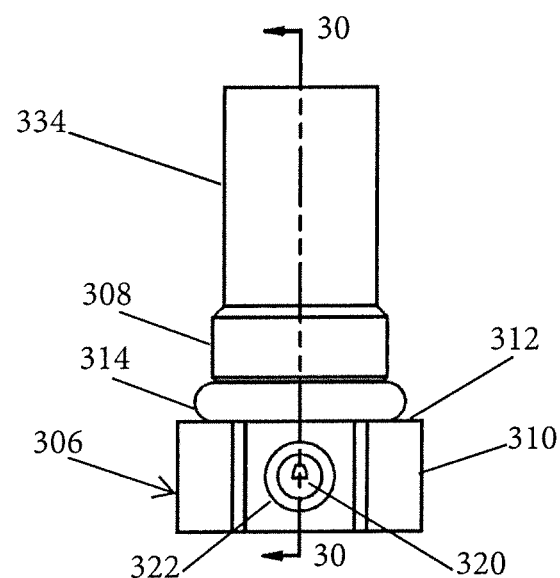
FIG. 27 is a side view of the pressure relief assembly of FIG. 25.
Figure 28:
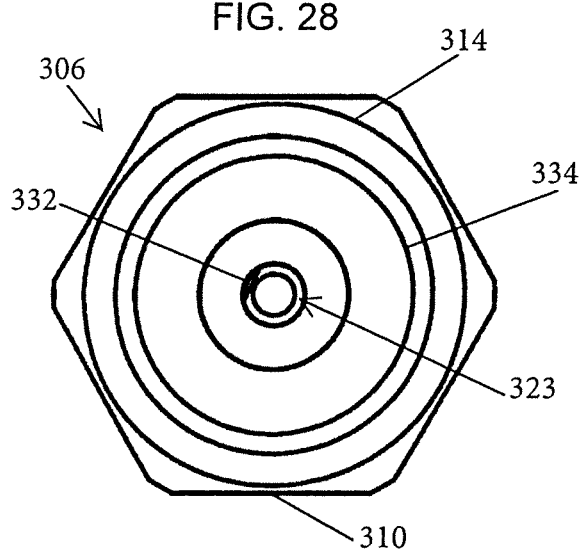
FIG. 28 is a view of one end of the relief assembly of FIG. 25.
Figure 29:
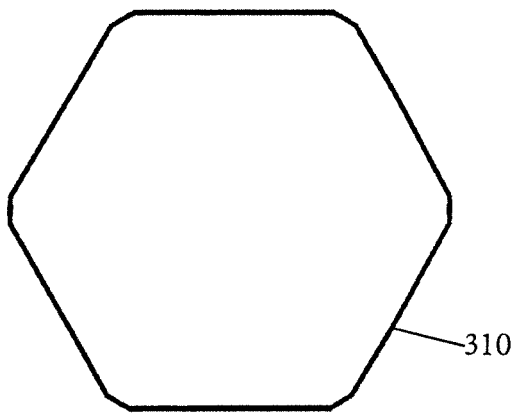
FIG. 29 is an end view of the other end of the pressure relief assembly of FIG. 25.
Figure 30:
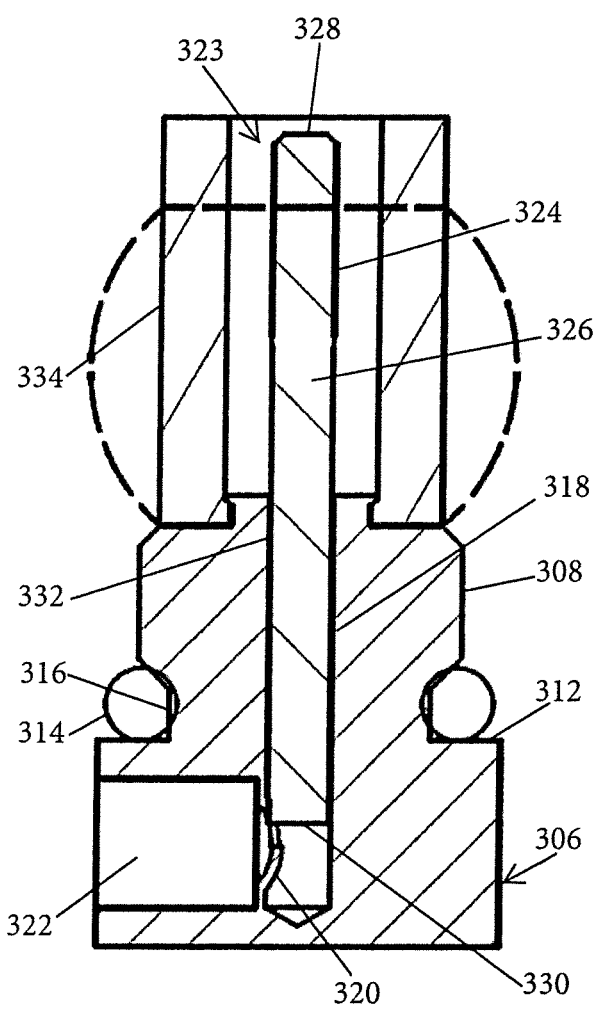
FIG. 30 is an enlarged sectional view taken on line 30-30 of FIG. 27.

FIGS. 25 and 26 illustrate another form of a overtravel pressure relief assembly 300 received in a bore 302 with a counterbore 304 through a rear head 54'''' of a gas spring 50'''' which may be installed and removed completely from the exterior of the gas spring. This relief assembly 300 may include a body 306 with an externally threaded portion 308 engageable with complimentary internal threads in the bore 302 and an enlarged non-circular head 310 with a hex, square or other non-circular configuration for engagement by a complimentary tool to install the relief assembly 300 in or remove it from the head 54". The body 306 may include a shoulder 312 which may bear on a planar surface of the counterbore to limit the extent to which the body may be threaded into the bore 302 in the head 54''''. A seal 314 such as an o-ring may be received in a circumferentially continuous groove 316 in the body 306 to provide a gas tight seal between the body and the head 54''''. As shown in FIGS. 25 and 30, the body 306 may have a axially extending blind bore 318 which may be co-axial with the threads 308 and with an open end communicating with a pressure chamber and adjacent the blind end with one face of a membrane 320 at least a portion of which projects radially into the bore 318. The exterior surface of the membrane 320 may communicate with a transverse bore 322 in the body 306 communicating with the exterior of the gas spring 50'''' desirably through the counterbore 304 in the head which opens to the exterior of the gas spring.

A plunger 323 may have a body 324 with a cylindrical exterior surface 326 with one end 328 configured to be engaged by an overtraveling piston rod 60" to advance the plunger 322 into the bore 318 and at the other end may have a relatively sharp edge 330 configured to cut, shear or otherwise breach the membrane 320 when the overtraveling piston rod 60" advances the sharp edge of the plunger body across at least part of the membrane. To provide a passage for compressed gas in the chamber 56" to communicate with the breached membrane, the body may have an axially extending recessed portion 332 which may be provided by an axially extending flat surface radially inboard of the circumferential periphery of the plunger body 324 and terminating adjacent to and somewhat spaced from the cutting edge 330 so that when the plunger 322 breaches the membrane 320 the passage 332 communicates with the exterior of the gas spring through the breached portion and the bores 322 & 304. When the pressure chamber 56" does not have compressed gas therein such as during shipping or servicing of the gas spring, a protective tube or sleeve 334 may be received in the bore 318 of the head 54'''' with one end bearing on the body 306 and the other end extending axially at least to and desirably slightly beyond the adjacent end 328 of the plunger 322 to prevent the piston rod 60'''' from accidentally engaging and moving the plunger to breach the membrane 320. This sleeve 334 may be received in the bore 302 with a slight interference fit. It may be made of a yieldable material such as a polymer or a thin metal which may be compressed or crushed when in use of the gas spring 50'''', the piston rod 60" overtravels to move the plunger 280 to breach the membrane 320. The basic construction and arrangement of the dimpled membrane 320, cutting edge 330 and vent surface 332 of the plunger 322, may be essentially the same as that of the membrane, cutting edge and vent surface of the plunger, of the relief assembly 260 and thus the description thereof will not be repeated hereat.

The pressure relief assemblies 70 and 160 with a plunger which may be press or intererference fit in a rear head or wall of a gas spring may be particularly desirable where there is little space or area in the head and/or pressure chamber of the gas spring, such as in small diameter gas springs, or where the gas spring will be discarded and not repaired or reused after a first or single incident of overtravel of its piston rod breaching the membrane of its relief assembly and venting the compressed gas in the chamber. Where it is desired to reuse a gas spring after its piston rod overtravel breaches the membrane of its relief assembly, the removable relief assemblies 210 and 300 and the removable membrane relief assembly 160 may be used. This may be particularly desirable with a gas spring of a larger diameter and/or a long stroke of its piston rod between its extended and designed retracted positions, because such gas springs are typically significantly more expensive to make than small diameter gas springs.

All of the disclosed pressure relief assemblies are actuated only by overtravel of the piston rod of the gas spring in which they are assembled regardless of the gas pressure to which its pressure chamber is initially charged and the maximum pressure produced in its chamber when the piston rod is retracted to its maximum design intended position. In other words these assemblies provide overtravel pressure relief without regard to the pressure of the compressed gas in the chamber and thus gas springs with these relief assemblies can be charged to various operating pressures depending on the particular application in which they are used. All of these piston rod overtravel pressure relief assemblies also provide a highly reliable operation since they are directly actuated to provide pressure relief only by axial retraction overtravel of the piston rod of the gas spring in which they are utilized.

While the various forms of the overtravel pressure relief assemblies herein constitute presently preferred embodiments, many others are possible. It is not intended herein to mention all of the possible embodiments or equivalent forms or ramifications of this invention. It is understood that the terms used herein are merely descriptive rather than limiting and that various changes may be made without departing from the spirit or scope of the invention.

The invention claimed is:

1. An industrial gas spring comprising:
   a casing including an axially extending side wall, an open end, a transversely extending end wall axially spaced from the open end, a gas pressure chamber defined in part be the side and end walls, a first blind bore in the end wall opening into and communicating with the gas pressure chamber, and a second blind bore in the end wall opening through an exterior face of the end wall and communicating with an exterior of the casing;
   a piston rod received at least in part in the casing for reciprocation between extended and retracted positions and having an inner end communicating with the pressure chamber and an outer end extending generally axially outwardly of the open end of the casing when the piston rod is in the extended position; and
   a pressure relief assembly carried by the end wall of the casing with:
      a membrane unitary with the end wall of the casing as a separating wall between the first and second blind bores and configured with a first face communicating with the pressure chamber and a second face communicating with the exterior of the casing; and
      a plunger with a first end adjacent the membrane and configured to breach the membrane and a second end axially spaced from the first end, disposed in the pressure chamber and configured to be engaged by the piston rod to move the plunger to breach the membrane when the piston rod overtravels its design intended maximum retracted position.

2. The gas spring of claim 1, wherein the plunger comprises a body with a cylindrical portion at least partially between the first and second ends of the plunger and the cylindrical portion is received in part in the first blind bore.

3. The gas spring of claim 2, wherein the body also comprises at least two circumferentially spaced apart and axially extending fingers adjacent the first end of the plunger and each having a relatively sharp edge for breaching the membrane when the edges are advanced at least partially through the membrane by overtravel of the piston rod moving the plunger toward the membrane.

4. The gas spring of claim 3, wherein the sharp edges are configured to be adjacent the periphery of the first bore.

5. The gas spring of claim 3, wherein each edge is spaced radially inwardly of the cylindrical portion of the body of the plunger and radially inwardly of the periphery of the first bore.

6. The gas spring of claim 2, wherein the body also comprises a single projection adjacent the first end of the plunger with a sharp edge configured to breach the membrane when moved at least partially through the membrane by the overtravel of the piston rod.

7. The gas spring of claim 2, which also comprises a vent passage through the plunger body.

8. The gas spring of claim 2, which also comprises a recess in the cylindrical surface and extending generally axially along the body to provide at least part of a vent passage between the pressure chamber and the membrane.

9. The gas spring of claim 1, wherein the plunger is frictionally received with an interference or transitional fit in the first blind bore in the end wall to ensure that the plunger does not inadvertently move out of the first blind bore.

10. The gas spring of claim 9, wherein the interference or transitional fit is an ISO H7/f6 fit.

11. The gas spring of claim 1, wherein the plunger includes a vent passage therein and through which gas in the gas pressure chamber flows to the exterior of the gas spring when the plunger breaches the membrane.

12. The gas spring of claim 1, wherein the plunger includes a body with a cylindrical outer surface at least partially between the first and second ends of the plunger and the cylindrical outer surface is received in part in the first blind bore and also includes a flat surface with a central portion radially inboard of the cylindrical outer surface to provide a vent passage in cooperation with the first blind bore through which gas in the gas pressure chamber flows to the exterior of the gas spring when the plunger breaches the membrane.

13. The gas spring of claim 1, wherein the second blind bore is larger than the first blind bore to provide clearance for cut or pierced portions of the membrane as it is breached by the plunger.

14. An industrial gas spring comprising:
   a casing including an axially extending side wall, an open end, a transversely extending end wall axially spaced from the open end, and a gas pressure chamber defined in part side and end walls;
   a piston rod received at least in part in the casing for reciprocation between extended and retracted positions and having an inner end communicating with the pressure chamber and an outer end extending generally axially outwardly of the open end of the casing when the piston rod is in the extended position; and
   a pressure relief assembly carried by the end wall and including:

a membrane unitary with the end wall of the casing and having a first face communicating with the pressure chamber and a second face communicating with the exterior of the casing, and a plunger disposed in the pressure chamber and configured to be engaged by the piston rod to move the plunger to breach the membrane when the piston rod overtravels its design intended maximum retracted position, and having a first end adjacent the membrane and configured to breach the membrane, a second end axially spaced from the first end, and a body with a cylindrical portion at least partially between the first and second ends and frictionally received in part in a blind bore of the casing with an interference or transitional fit to ensure that the plunger does not inadvertently move out of the blind bore.

15. The gas spring of claim 14, wherein the interference or transitional fit is an ISO H7/f6 fit.

16. The gas spring of claim 14, wherein the plunger includes a vent passage therein and through which gas in the gas pressure chamber flows to the exterior of the gas spring when the plunger breaches the membrane.

17. The gas spring of claim 14, wherein the plunger body has a cylindrical outer surface at least partially between the first and second ends of the plunger, and a flat surface with a central portion radially inboard of the cylindrical outer surface to provide a vent passage in cooperation with the first blind bore through which gas in the gas pressure chamber flows to the exterior of the gas spring when the plunger breaches the membrane.

18. The gas spring of claim 14, further comprising a second blind bore larger that the blind bore to provide clearance for cut or pierced portions of the membrane as it is breached by the plunger.

* * * * *